C. W. HAZELETT.
STORAGE BATTERY TERMINAL.
APPLICATION FILED NOV. 3, 1916.
1,376,143.
Patented Apr. 26, 1921.
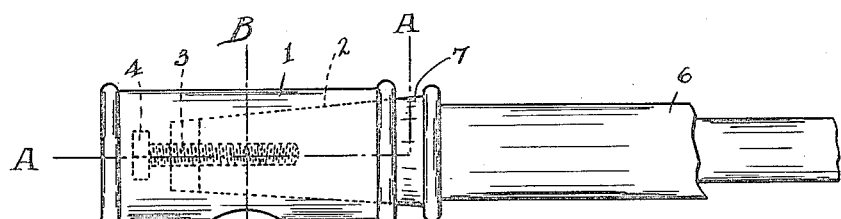
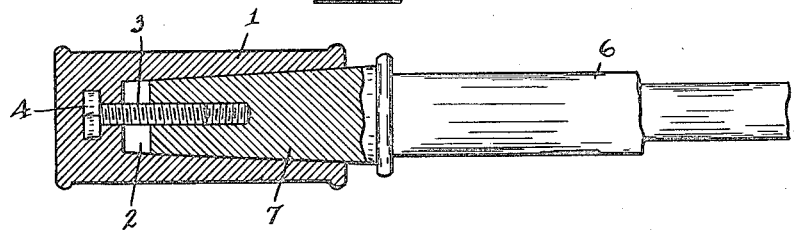
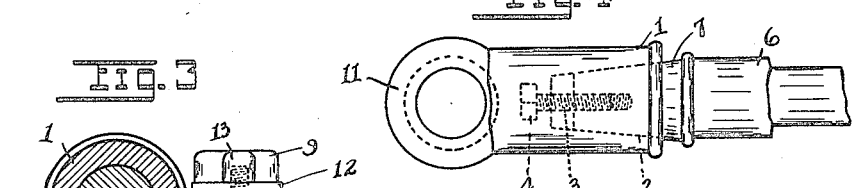
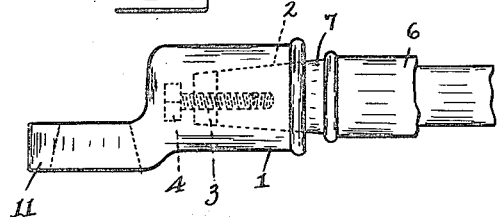
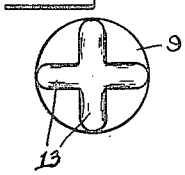
INVENTOR.
C.W. HAZELETT
BY *J. Adams.*
ATTORNEY

UNITED STATES PATENT OFFICE.

CLARENCE W. HAZELETT, OF LAKEWOOD, OHIO, ASSIGNOR, BY MESNE ASSIGNMENTS, TO NATIONAL CARBON COMPANY, INC., A CORPORATION OF NEW YORK.

STORAGE-BATTERY TERMINAL.

1,376,143.      Specification of Letters Patent.      Patented Apr. 26, 1921.

Application filed November 3, 1916. Serial No. 129,260.

*To all whom it may concern:*

Be it known that I, CLARENCE W. HAZELETT, a citizen of the United States, residing at Lakewood, in the county of Cuyahoga and State of Ohio, have invented a certain new and useful Improvement in Storage-Battery Terminals, of which the following is a full, clear, and exact description.

This invention relates to storage battery connections and particularly relates to so-called adapters.

Referring to the drawings:

Figure 1 is a plan of my improved form of connector.

Fig. 2 is a partial sectional view of the connector taken on the broken line A—A of Fig. 1.

Fig. 3 is a cross section of the connector taken on the line B—B of Fig. 1 with a storage battery plate post fastened in the connector.

Figs. 4 and 5 are top and side views respectively of a different type of terminal embodying my invention.

Fig. 6 is a plan view of the nut shown in Fig. 3.

The adapter has a sleeve portion 1 having an inner conical socket 2 and an interior screw 3 with the head 4 cast in the closed end. This screw is preferably brass or some other material that possesses more strength than hard lead. Projecting substantially at right angles from the sleeve portion is an eye member 5 which is adapted to fit over the plate post. A cable 6 is cast or otherwise secured in a conical terminal member 7 of brass which is adapted to fit into the socket 2 and thread onto the screw 3.

The manner in which my improved form of connector will be assembled will now be described. After the plates have been placed in the cell and the cell otherwise finished, the terminal 7 of the cable 6 is placed in the socket 2 of the adapter 1 and the latter is rotated to thread the screw into the terminal. When the two parts have been drawn sufficiently together by means of the screw, the eye 5 of the adapter is then placed over the plate post 8 as shown in Fig. 3. The nut 9 is then screwed down on screw 10 which has been previously cast in the plate post 8.

This improved form of adapter has a very neat appearance, and since the brass screw is entirely surrounded by non-corrodible hard lead, a very perfect union of low resistance is formed. The connection is also of such construction that the cable terminal 7 cannot be accidentally jarred loose from the adapter, especially if it is given a slight reverse twist to maintain a twisting moment in the tightening direction after the adapter is clamped in position.

My improved cable connection is not limited in its application to any particular form of storage battery connection. Instead of applying the cable to an adapter as shown in Figs. 1 and 2, I may use it in connection with a construction such as is shown in Figs. 4 and 5 for example. In these figures the terminal is screwed into the cable in the same way as previously described, but the connection differs from the other modifications in that it has a lug or eye 11 adapted to be fitted to a plate post or to any other member.

In Figs. 3 and 6 I have shown a special form of nut for clamping the adapter to the plate post. This consists of a flange or washer 12 integrally joined to thumb members 13 which may be conveniently gripped to screw down or unscrew the connection.

Having described my invention, what I claim is:

1. In storage batteries, a plate post, an adapter having a lug with an opening to fit over said post and having a socket portion integral with said lug and closed at one end, a screw having its head secured in the closed end of the socket and a cable terminal fitting in said socket, said terminal having a threaded opening adapted to coöperate with said screw to draw the terminal into the socket when the adapter is rotated relative to the terminal.

2. In storage batteries, a plate post, an adapter having a lug with an opening to fit over said post and having an integral socket member closed at one end, a terminal member fitting in said socket and a screw having one end secured in one of said members, the other member having a threaded opening adapted to coöperate with said screw to draw the terminal member into the socket member.

3. A storage battery terminal comprising a lug having an opening adapted to fit over a plate post, and a socket portion integral with said lug and closed at one end, the bottom of such integral socket portion carrying threaded means adapted to coöperate with threaded means on a terminal member fitting in such socket, so as to draw said terminal member into said socket member.

In testimony whereof I hereunto affix my signature.

C. W. HAZELETT.